UNITED STATES PATENT OFFICE.

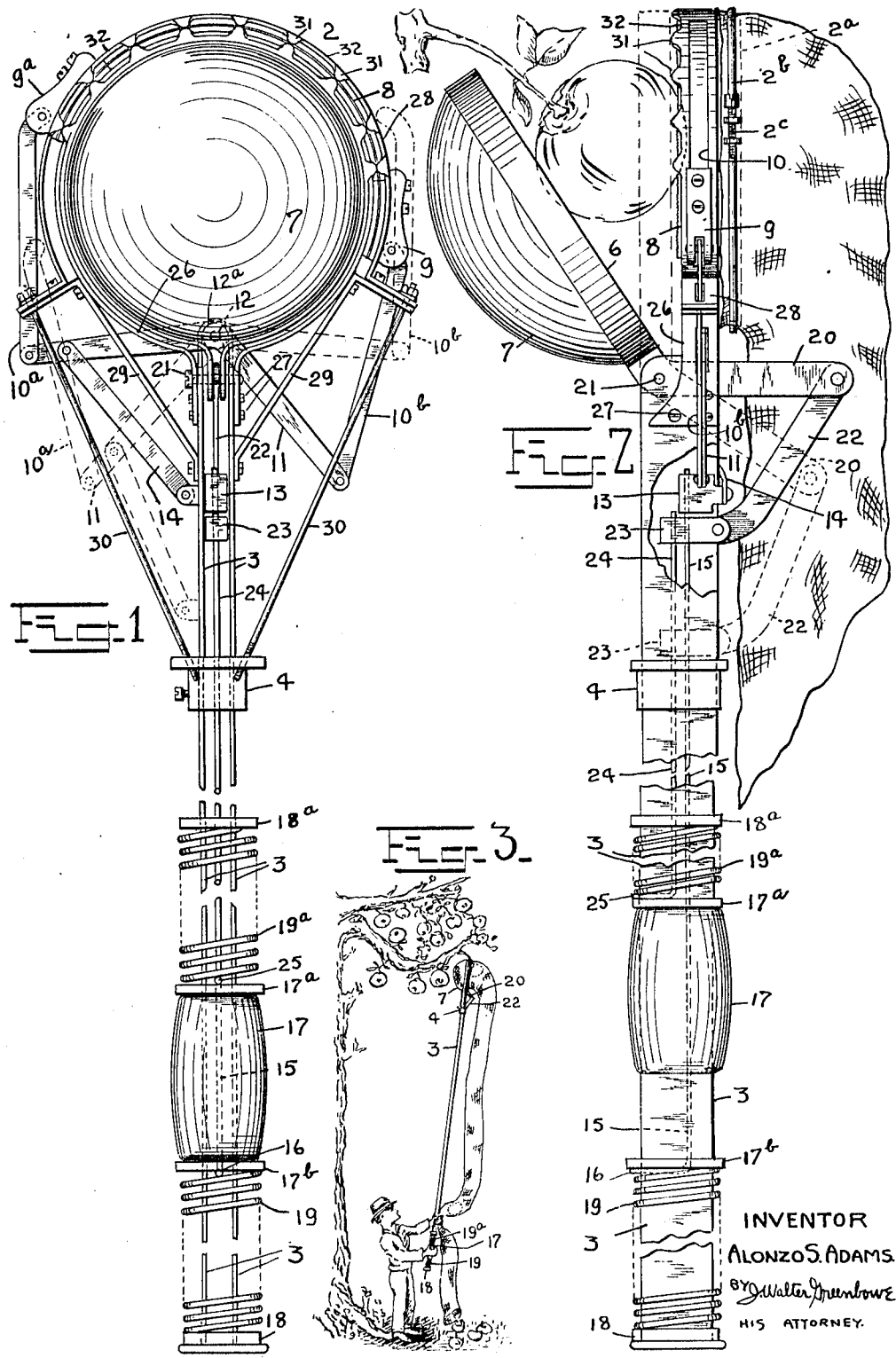

ALONZO SCOTT ADAMS, OF WALTHAM, MASSACHUSETTS.

FRUIT-PICKER.

1,309,712.  Specification of Letters Patent.  Patented July 15, 1919.

Application filed December 4, 1918. Serial No. 265,235.

*To all whom it may concern:*

Be it known that I, ALONZO S. ADAMS, a citizen of the United States, residing at 59 Chester Ave., Waltham, in the county of Middlesex and the State of Massachusetts, have invented certain new and useful Improvements in Fruit-Pickers, fully described and represented in the following specification and the accompanying drawings, forming a part of the same.

My invention relates to improvements in fruit gatherers or fruit picking implements and is particularly designed to provide an economic construction and an efficient means of removing various kinds of fruit from trees. My invention consists in mounting a stationary jaw and a movable jaw upon a staff or elongated handle and in providing the implement with a reciprocating cutting-tool for severing the stem of the fruit.

It is well known that considerable care must be exercised in removing or picking and in handling marketable fruit to prevent rupture or abrasion of its surface, also that when the stem is pulled from the fruit it will be subject to an early decay.

In my device the foregoing disadvantages as commonly found in fruit pickers, has been overcome. My device affords a means of positively and conveniently severing the stem of the fruit at substantially right angles, and provision is also made to prevent the fruit from contacting with the cutting-tool, thereby avoiding the danger of spoiling the fruit during the picking operation. My invention further provides many improvements in construction, as for instance, where springs are necessary to its operation they are removed from that part of the device which is thrust into the branches of the tree and thereby eliminating the possibility of said springs becoming entangled with the branches of the tree and broken or dislodged.

These objects I accomplish in the manner illustrated in the accompanying drawing and described in the accompanying specification in which,—

Figure 1 is a front view of the device showing the hand-grip in its neutral position and the jaw closed; Fig. 2 is a side elevation (a part of the supporting structure being omitted) showing the jaw open; Fig. 3 illustrates the device as used.

Similar numerals refer to similar parts throughout the several views.

My fruit-picker is composed of a light pole or staff, which as a whole, is designated by the numeral 1. The staff may be of any suitable material and as shown is formed of two separated and parallel metal strips 3, which also act as a guide member to certain movable parts of the device. Near the upper end of the pole is rigidly secured a flanged collar 4 which aids to keep the strips in their parallel position and to perform other duties to be hereinafter described.

Fixed to the upper end of the guide-member is a frame or stationary-jaw, which as a whole, is designated by the numeral 2. This stationary-jaw may be of any desired perimeter but is preferably made in the form of a ring and provided with a detachable fabric tube or bag secured at one side thereof. Adjacent the stationary-jaw is a movable-jaw 6 of similar shape to the stationary-jaw and equipped with a covering to form a pocket 7. By providing the frame 2 with an extension $2^a$, either a cloth tube or a bag mouth may be passed over the said extension and secured by the spring band $2^b$, and locked by the screw $2^c$. By this means a bag or tube may be readily substituted as desired, depending upon the kind of fruit to be picked.

Mounted on the frame is a reciprocating cutting-tool 8, which is preferably in the form of a saw. The ends of the cutting-tool are securely held in chucks or saw carriers 9 and $9^a$. The said saw-carriers are movable in slots 10 provided in the frame. The saw-carriers are loosely attached to links $10^a$ and $10^b$, the said links being movably connected to opposite ends of a rocking arm 11 which is arranged to swing on its fulcrum by means of a pin 12 which is supported in bearing $12^a$ at the lower side of the stationary-jaw at the upper end of the staff.

One end of the rocking-arm is connected to a sliding block 13 by a link 14. The said block is movably retained between the strips which form the guide-member 3. Firmly secured to the block is one end of a rod 15 which passes downwardly between the sides of the guide-member. The opposite end 16 of the rod is bent to a right angle and is of sufficient length to project from the guide-member.

Movably fitted to the pole and above the projecting end of the rod is a slidable hand-grip or sleeve 17. Above and below the hand-grip are detached ferrules $17^a$ and $17^b$ and movable therewith. Below the projecting end 16 of the rod at a suitable distance therefrom is a fixed collar or stop 18 and between the stop and the end of the rod is located a helical spring 19.

Referring to the movable jaw: At the lower side of the jaw, integral therewith and extending substantially transversely with the pole, when the jaw is open, is an arm 20. The said jaw and arm being movably held upon the upper end of the guide-member by means of a pin 21, a link 22 being provided to connect the said arm to a sliding block 23 located below the block 13 and between the guides of the guide-member 3. One end of a rod 24 is rigidly secured to the block 23, the said rod then passes downwardly and its opposite end 25 is bent at a right angle and is of sufficient length to project from between the said guides. Thus the lower side of the projecting end of the rod will be in contact with the upper side of the ferrule which is moved by the hand-grip.

At a suitable distance above the end of the rod, a collar or stop 18$^a$ is fixed to the pole and between the said stop and the end of the rod is located a helical spring 19$^a$.

The two opposing springs 19 and 19$^a$ operate to hold the hand-grip in a neutral position (see Fig. 1) and when in such position the spring 19$^a$ contacting with the rod end 25 tends to draw the rod downwardly and keep the jaw 6 normally closed. In like manner the rod 15 receives an opposite movement from the spring 19 and the motion is carried to the cutting-tool to hold the same in the desired normal position. It will therefore be readily seen that by moving the hand-grip upwardly the jaw is opened and by then moving the grip downwardly the jaw closes and by continuing the downward movement of the grip its contact with the rod end 16 moves the rod and operates the saw. When released the various parts automatically take their normal positions through the actions of the springs.

The movable-jaw and the cutting-tool are thus controlled by the springs but are operable independent of each other. The opposite positions of some of the movable parts being shown in dotted lines in Figs. 1 and 2.

I do not limit my device to the construction as shown in the drawing but preferably form the frame 2 of a split ring 26 the ends of which are turned outwardly and held together and to the guide-member by tap-bolts 27. Partially surrounding and of a greater diameter than the ring I provide a guide 28 which, in coöperation with the ring 26 serves to guide the circumferential movement of the saw. The saw is in such position as to be removed from the possibility of its edge coming in contact with any fruit during the process of picking.

Around a portion of the periphery of the frame is provided a plurality of lugs 31 spaced at intervals to form notches 32 to confine the movement of the stem of the fruit when being cut by the saw. The said lugs are arranged in pairs on the component parts of the frame and are bent toward and made to touch each other to bridge the space between the said parts of the frame and thereby give additional protection against the fruit contacting the cutting edge of the tool.

Struts 29 secure the guide 28 to the ring 26 and to the pole. To give rigidity to the whole I also provide truss-members 30 which are threaded upon their lower ends and secured in tapped holes in the flanged collars 4 and which have their opposite ends securely fastened to the frame.

The operation of removing fruit from the plant with my device is as follows:

The pole is firmly grasped with one hand while the other hand grasps the hand-grip. The hand-grip is then moved upwardly and the movable-jaw is opened. The fruit-picker in then manipulated until the article of fruit is between the jaws; whereupon the grip is permitted to receive the action of its operating spring and move downwardly thereby causing the said spring to actuate the rod connected to the said jaw and close the same. The stem of the fruit is then securely held between the jaws and in one of the notches in contact with the cutting edge of the tool. The grip then being in its neutral position it is moved downwardly whereby its contact with the end of the rod connected with the cutting tool operates the said tool to cut the stem of the fruit which falls into the bag or if a tube is used the fruit may be permitted to fall through the tube and be stopped by the hand of the operator to break its fall (as shown in Fig. 3) and then released and permitted to pass to the ground or into any suitable receptacle, making it unnecessary to lower the implement for the removal of the fruit. Upon releasing the grip the saw again automatically takes its normal position through the action of the spring provided for such purpose.

Now having described my improvement, I claim as my invention:

1. A device for picking fruit comprising a pole having a movable jaw and bag or tube supporting frame secured at one end thereof, a cutting tool arranged to be reciprocated upon the said frame, means for moving the said jaw in close relation to the frame to hold the stem of the fruit in contact with the cutting tool and means whereby the said cutting tool is drawn across the stem to sever the fruit from the tree.

2. A device for picking fruit comprising an elongated handle, a movable jaw and a stationary jaw secured at one end of the said handle a saw having its ends supported by carriers and arranged to be reciprocated upon the periphery of the frame, means for moving the jaw and thereby hold a fruit stem in contact with the saw and means whereby the said saw may be moved across the stem to sever the same.

3. A device for removing fruit from trees comprising an elongated handle, a movable jaw and a stationary jaw at one end thereof, a cutting tool supported on carriers and continuous around one portion of the periphery of the frame and arranged to be oscillated, means for moving the jaw and thereby cause the stem of the fruit to be picked, to be held in contact with the cutting tool and at approximately right angles thereto, means for moving the cutting tool and thereby cut the said stem.

4. A fruit-picker comprising an elongated handle and having at one end thereof a stationary-jaw, and a movable-jaw held normally in contact therewith, a reciprocating cutting-tool mounted upon the stationary-jaw, a hand-grip arranged to oscillate upon the said handle, mechanism connecting the hand-grip with the said movable-jaw whereby the jaw is opened when the hand-grip is moved in one direction and mechanism connecting the hand-grip with the said cutting-tool whereby the said tool is operated by the opposite movement of the hand-grip and means for automatically returning the said hand-grip to a neutral position.

5. A fruit-picker comprising a handle and having at one end thereof a stationary-jaw and a movable-jaw, a reciprocating cutting-tool mounted upon the said stationary-jaw, a hand-grip slidable upon the handle, mechanism connecting the said hand-grip with the movable-jaw for operating the said movable-jaw, mechanism connecting the hand-grip with the said cutting-tool for operating the said tool, springs arranged to normally retain the hand-grip in a neutral position, the said springs being located in such position as to avoid contacting with the branches of the tree when the device is in operation.

6. A device for picking fruit comprising a pole having a movable jaw and stationary jaw secured at one end thereof, a cutting tool arranged to be reciprocated upon the stationary jaw, a plurality of notches on the stationary jaw, means for moving the said movable jaw in close relation to the stationary jaw to hold the stem of the fruit in one of the said notches and in contact with the cutting tool and means whereby the said cutting tool is drawn across the stem to sever the fruit from the tree.

In testimony whereof I have hereunto set my hand in the presence of two subscribing witnesses.

ALONZO SCOTT ADAMS.

Witnesses:
 LLOYD R. WYMAN,
 E. FORREST HODGES.

Copies of this patent may be obtained for five cents each, by addressing the "Commissioner of Patents, Washington, D. C."